(12) United States Patent
Im et al.

(10) Patent No.: US 8,838,683 B2
(45) Date of Patent: Sep. 16, 2014

(54) METHOD AND APPARATUS FOR RECEIVING DATA BY USING PEER-TO-PEER PORTAL SERVER

(75) Inventors: Sung-bin Im, Yongin-si (KR); O-hoon Kwon, Suwon-si (KR); Guanhua Zhang, Suwon-si (KR); Chapalamadugu Akhil, Suwon-si (KR); Hee-seok Yu, Suwon-si (KR); Sang-kwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 12/538,210

(22) Filed: Aug. 10, 2009

(65) Prior Publication Data

US 2010/0131596 A1    May 27, 2010

Related U.S. Application Data

(60) Provisional application No. 61/117,272, filed on Nov. 24, 2008.

(30) Foreign Application Priority Data

Jan. 23, 2009    (KR) ........................ 10-2009-0006272

(51) Int. Cl.
*G06F 15/16*    (2006.01)

(52) U.S. Cl.
USPC ............ 709/204; 709/202; 709/218; 709/227

(58) Field of Classification Search
CPC ..... H04L 67/104; H04L 67/06; H04L 67/108; H04L 67/1063
USPC .................................. 709/204, 202, 218, 227
See application file for complete search history.

(56) References Cited

U.S. PATENT DOCUMENTS

| 2003/0002521 A1* | 1/2003 | Traversat et al. ............ 370/465 |
| 2003/0028623 A1* | 2/2003 | Hennessey et al. ........... 709/219 |
| 2004/0148434 A1* | 7/2004 | Matsubara et al. ........... 709/246 |
| 2004/0162871 A1* | 8/2004 | Pabla et al. ................... 709/201 |
| 2005/0198317 A1 | 9/2005 | Byers |
| 2008/0133758 A1 | 6/2008 | Lee et al. |
| 2008/0160911 A1 | 7/2008 | Chou et al. |
| 2008/0163324 A1 | 7/2008 | Chen |

(Continued)

FOREIGN PATENT DOCUMENTS

| KR | 10-2003-0088253 A | 11/2003 |
| WO | 2005/091595 A1 | 9/2005 |

(Continued)

OTHER PUBLICATIONS

International Search Report and Written Opinion issued on Mar. 31, 2010 in counterpart International Application No. PCT/KR2009/004524.

(Continued)

*Primary Examiner* — Nicholas Taylor

(74) *Attorney, Agent, or Firm* — Sughrue Mion, PLLC

(57) ABSTRACT

Method and apparatus for receiving data by using a plurality of pieces of information managed by a server that manages information about data that can be received via one or more peer-to-peer (P2P) networks and information about peers respectively connected to each P2P network.

9 Claims, 4 Drawing Sheets

(56) References Cited

U.S. PATENT DOCUMENTS

| | | | | |
|---|---|---|---|---|
| 2008/0189702 A1* | 8/2008 | Morgan et al. | | 718/100 |
| 2008/0235331 A1* | 9/2008 | Melamed et al. | | 709/204 |
| 2008/0235746 A1 | 9/2008 | Peters et al. | | |
| 2008/0313265 A1* | 12/2008 | Pounds et al. | | 709/202 |
| 2009/0106393 A1 | 4/2009 | Parr et al. | | |
| 2011/0119724 A1* | 5/2011 | Damola et al. | | 725/110 |

FOREIGN PATENT DOCUMENTS

| | | |
|---|---|---|
| WO | 2006/036763 A2 | 4/2006 |
| WO | 2007/095309 A2 | 8/2007 |
| WO | 2007149186 A2 | 12/2007 |
| WO | 2008064356 A1 | 5/2008 |

OTHER PUBLICATIONS

European Search Report issued on Feb. 27, 2012 in corresponding European Application No. 09827684.3.
European Search Report issued on Mar. 28, 2012 in corresponding European Application No. 09827658.7.
Lui, Siu Man, et al. ACM SIGecom Exchanges, "Interoperability of Peer-To-Peer File Sharing Protocols". vol. 3, No. 3, pp. 25-33, Aug. 2002.
Written Opinion (PCT/ISA/237), dated Jun. 22, 2010, issued by the International Searching Authority in counterpart International Patent Application No. PCT/KR2009/006399.
Communication dated Jul. 3, 2013 issued by the State Intellectual Property Office of P.R. China in counterpart Chinese Patent Application No. 200980146961.0.
Communication dated Jul. 24, 2013 issued by the State Intellectual Property Office of P.R. China in counterpart Chinese Patent Application No. 200980146325.8.
Communication dated Feb. 19, 2010 issued by the European Patent Office in counterpart European Patent Application No. 09170797.6.
Communication dated Nov. 5, 2010 issued by the European Patent Office in counterpart European Patent Application No. 09170797.6.
Communication dated Mar. 21, 2011 issued by the European Patent Office in counterpart European Patent Application No. 09 170 797.6.

* cited by examiner

METHOD AND APPARATUS FOR RECEIVING DATA BY USING PEER-TO-PEER PORTAL SERVER

CROSS-REFERENCE TO RELATED PATENT APPLICATION

This application claims the benefit of priority from U.S. Provisional Patent Application No. 61/117,272, filed on Nov. 24, 2008, in the U.S. Patent and Trademark Office, and the benefit of priority from Korean Patent Application No. 10-2009-0006272, filed on Jan. 23, 2009, in the Korean Intellectual Property Office, the disclosures of which are incorporated herein by reference in their entirety.

BACKGROUND OF THE INVENTION

1. Field of the Invention

Methods and apparatuses consistent with the present invention relates to a method and apparatus for receiving data exchanged in a peer-to-peer (P2P) network, and more particularly, to a method and apparatus for receiving data exchanged between a plurality of P2P networks.

2. Description of the Related Art

A peer-to-peer (P2P) network indicates an overlay network that constitutes a logical network within an Internet Protocol (IP) network. In the P2P network, P2P devices connected in the P2P network are equal network entities of a same layer, and simultaneously function as clients and servers. Since each P2P device participating in the P2P network receives data and transmits the data back to other P2P devices, an excessive load does not occur in one P2P device so that the data may be efficiently exchanged by using an appropriate bandwidth.

The P2P network may be managed by a tracker server. This tracker server contains information about the P2P devices connected in the P2P network and information about the data exchanged in the P2P network. The tracker server manages the P2P network by transmitting information to the P2P devices.

SUMMARY OF THE INVENTION

The present invention provides a method and an apparatus for receiving data exchanged in a peer-to-peer (P2P) network.

The present invention also provides a computer readable recording medium having recorded thereon a program for executing the method.

According to an aspect of the present invention, there is provided a method of receiving predetermined data, performed by a first device. The method includes the operations of receiving from a server information about data that can be received via one or more P2P networks and information about one or more peers respectively connected to each P2P network; and receiving the predetermined data via a second device connected to the P2P network which can receive the predetermined data and which is one of the P2P networks.

The first device and the second device may be devices included in same home network.

The operation receiving the predetermined data may include the requesting predetermined data from the second device connected to the P2P network which can receive the predetermined data, based on the two pieces of information received from the server; and receiving the predetermined data as a response to the requesting, wherein the second device receives the predetermined data via the P2P network which can receive the predetermined data, and transmits the predetermined data to the first device.

The information about the peers may include one or more of information about globally unique identifiers (GUIDs) of the peers and information about internet protocol (IP) addresses of the peers.

According to another aspect of the present invention, there is provided a method of managing information about data, performed by a server. The method includes the operations of receiving information about data exchanged in one or more P2P networks and information about one or more peers respectively connected to each P2P network from one or more tracker servers; and transmitting the two pieces of information to a predetermined device connected to the server.

According to another aspect of the present invention, there is provided a method of relaying data, performed by a second device. The method includes the operations of receiving a request from a first device, wherein the request is for predetermined data exchanged in a P2P network to which the second device is connected; and receiving the predetermined data via the P2P network according to the request; and transmitting the predetermined data to the first device.

According to another aspect of the present invention, there is provided a data receiving apparatus corresponding to a first device for receiving predetermined data. The data receiving apparatus includes a data information receiving unit which receives from a server information about data that can be received via one or more P2P networks and information about one or more peers respectively connected to each P2P network; and a data receiving unit which receives the predetermined data via a second device connected to the P2P network which can receive the predetermined data and which is one of the P2P networks.

According to another aspect of the present invention, there is provided an information managing apparatus for managing information about data stored on a server. The information managing apparatus includes a data information collecting unit which receives information about data exchanged in one or more P2P networks and information about one or more peers respectively connected to each P2P network from one or more tracker servers; and a data information transmitting unit which transmits the two pieces of information to a predetermined device connected to the server.

According to another aspect of the present invention, there is provided a data relaying apparatus corresponding to a second device. The data relaying apparatus includes a request receiving unit which receives a request from a first device, where the request is for predetermined data exchanged in a P2P network to which the second device is connected; and a data relaying unit which receives the predetermined data via the P2P network according to the request, and transmits the predetermined data to the first device.

According to another aspect of the present invention, there is provided a computer readable recording medium having recorded thereon a program for executing the method of receiving predetermined data, the method of managing information, or the method of relaying data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Hereinafter, the present invention will be described in detail by explaining exemplary embodiments with reference to the attached drawings.

Figure 1:
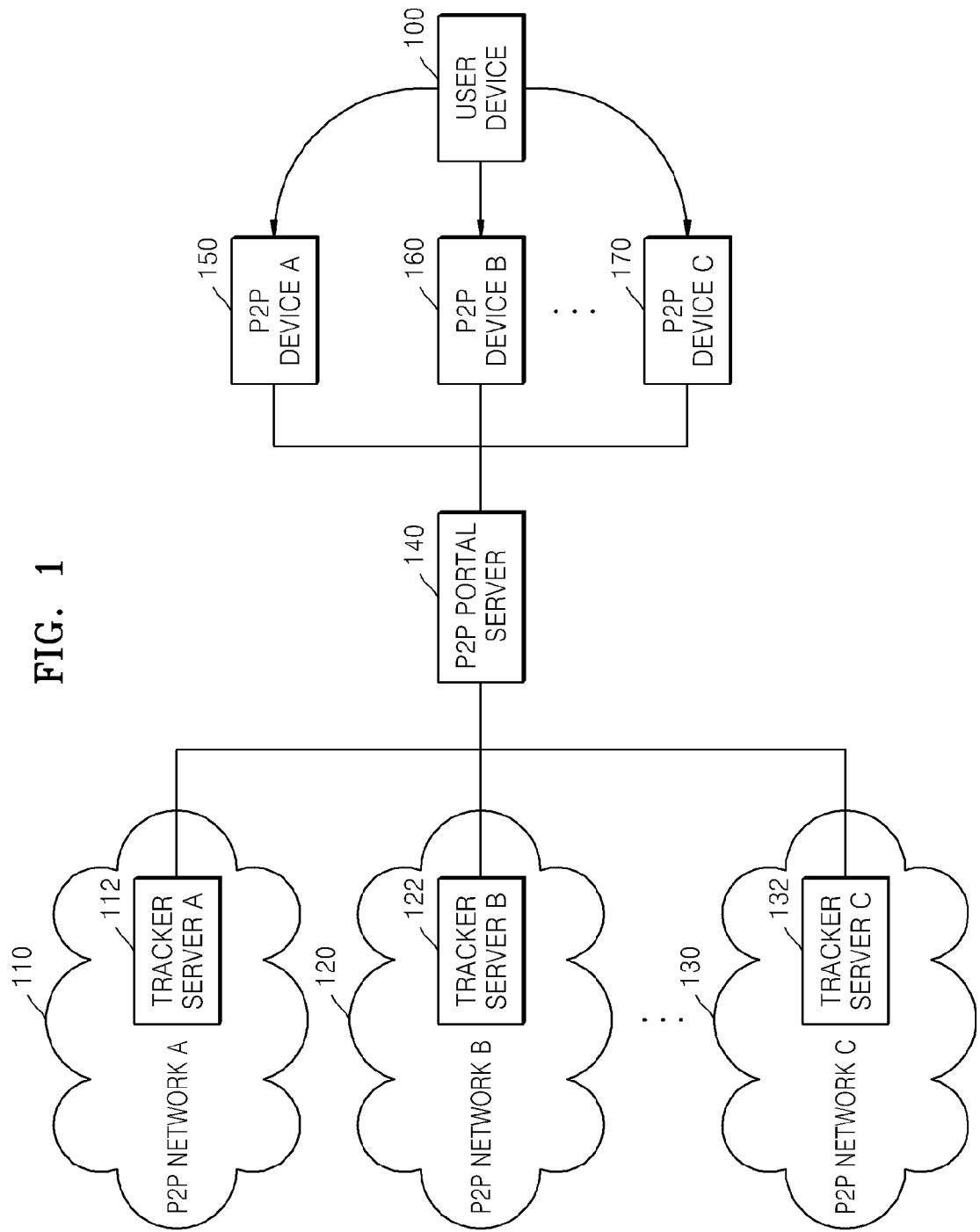
FIG. 1 is a diagram of a data reception system via a peer-to-peer (P2P) network according to an exemplary embodiment of the present invention.

FIG. 1 is a diagram of a data reception system via a peer-to-peer network according to an exemplary embodiment of the present invention.

Referring to FIG. 1, a user device 100 according to an exemplary embodiment may receive data exchanged between a plurality of peer-to-peer (P2P) networks (hereinafter, referred to as a 'P2P' network). The user device 100 functions to be the destination and receive data via the P2P network and may be a media player for receiving and reproducing media data. The user device 100 may be a media player that does not have a P2P client function for directly accessing the P2P network.

As described above, the P2P network is an overlay network and is managed by a tracker server. Referring to FIG. 1, a plurality of P2P networks A, B and C 110, 120 and 130 exist in the data reception system, and the P2P networks 110, 120 and 130 are respectively managed by tracker servers A, B, and C 112, 122, and 132.

According to the related art, in order for the user device 100 to access the P2P network A 110, the user device 100 has to have a P2P client function of the P2P network A 110. For example, the user device 100 has to have an application for enabling the user device 100 to access the tracker server A 112 that manages the P2P network A 110, thereby accessing the P2P network A 110 and receiving data via the P2P network A 110.

However, according to an exemplary embodiment, although the user device 100 does not have the P2P client function of the P2P network A 110, the user device 100 receives data exchanged in the P2P network A 110 via a P2P device A 150 that has the P2P client function of the P2P network A 110. The data is not limited in terms of types and may be audio-video (AV) media data. Also, the data may be streaming data exchanged in the P2P network when AV media content is streamed.

Likewise, the user device 100 not having a P2P client function of the P2P network B 120 receives data via a P2P device B 160 having the P2P client function of the P2P network B 120, where the data is exchanged in the P2P network B 120.

In order for the user device 100 to receive data exchanged in the P2P networks 110, 120 and 130 via the P2P devices A, B, and C 150, 160 and 170, it is necessary to know which data is shared between the P2P networks 110, 120 and 130.

Thus, the P2P network according to an exemplary embodiment includes a P2P portal server 140 for managing all information about data that can be exchanged via the P2P networks 110, 120 and 130.

The P2P portal server 140 receives and manages information about data from the tracker servers A, B, and C 112, 122, and 132 for respectively managing a plurality of P2P networks, where the data can be received via each of the plurality of networks. For example, the P2P portal server 140 respectively receives information about data that can be received via the P2P network A 110, information about data that can be received via the P2P network B 120, and information about data that can be received via the P2P network C 130 from the tracker servers A, B, and C 112, 122, and 132, respectively.

The information about the data may be metadata of AV data. In case where the data is related to a P2P streaming service, the information may be about streaming channels respectively that can be received from each of the plurality of P2P networks.

Also, the P2P portal server 140 receives and manages information about peers connected to each of the P2P networks, that is, information about the P2P devices A, B, and C 150, 160 and 170 from the tracker servers A, B, and C 112, 122, and 132, respectively.

The information about the peers includes information for identifying the peers. For example, the information may include one or more of information about a globally unique identifier (GUID) and information about an internet protocol (IP) address.

The information received from the tracker servers A, B, and C 112, 122, and 132 is transmitted to the user device 100 connected to the P2P portal server 140. The user device 100 selects target data based on information about data that can be received via the P2P networks 110, 120 and 130, and selects a P2P device (from among the P2P devices 150, 160 and 170) to be used for receiving the selected data based on information about peers connected to each of the P2P networks 110, 120 and 130.

A table below shows the information about data and the information about peers, which are managed by the P2P portal server 140 as described above. Specifically, the first column identifies the P2P network such as for example, P2P Network A 110, P2P Network B 120, and P2P Network C 130, shown in FIG. 1. The second column identifies data that can be received via respective P2P network such as DA1, DA2, and DA3 of the P2P Network A, DB1, DB2, and DB3 of the P2P Network B, and DC1, DC2, and DC3 of the P2P Network C. The third column identifies devices connected to the respective P2P network, such as P2P device PA1, P2P device PA2, and P2P device PA3 for P2P network A, P2P device PB1, P2P device PB2, and P2P device PB3 for P2P network B, and P2P device PC1, P2P device PC2, and P2P device PC3 for P2P network C. Last column provides an IP address for each device.

TABLE 1

| P2P Network A | DA1, DA2, DA3, ... | PA1 | IP Address A1 |
| | | PA2 | IP Address A2 |
| | | PA3 | IP Address A3 |
| | | ... | ... |
| P2P Network B | DB1, DB2, DB3, ... | PB1 | IP Address B1 |
| | | PB2 | IP Address B2 |
| | | PB3 | IP Address B3 |
| | | ... | ... |
| P2P Network C | DC1, DC2, DC3, ... | PC1 | IP Address C1 |
| | | PC2 | IP Address C2 |
| | | PC3 | IP Address C3 |
| | | ... | ... |
| ... | ... | | ... |

As shown in the above table, data exchanged in each of P2P networks A, B, and C, and P2P devices connected to each of the P2P networks A, B, and C are managed by the P2P portal server 140.

Figure 2:
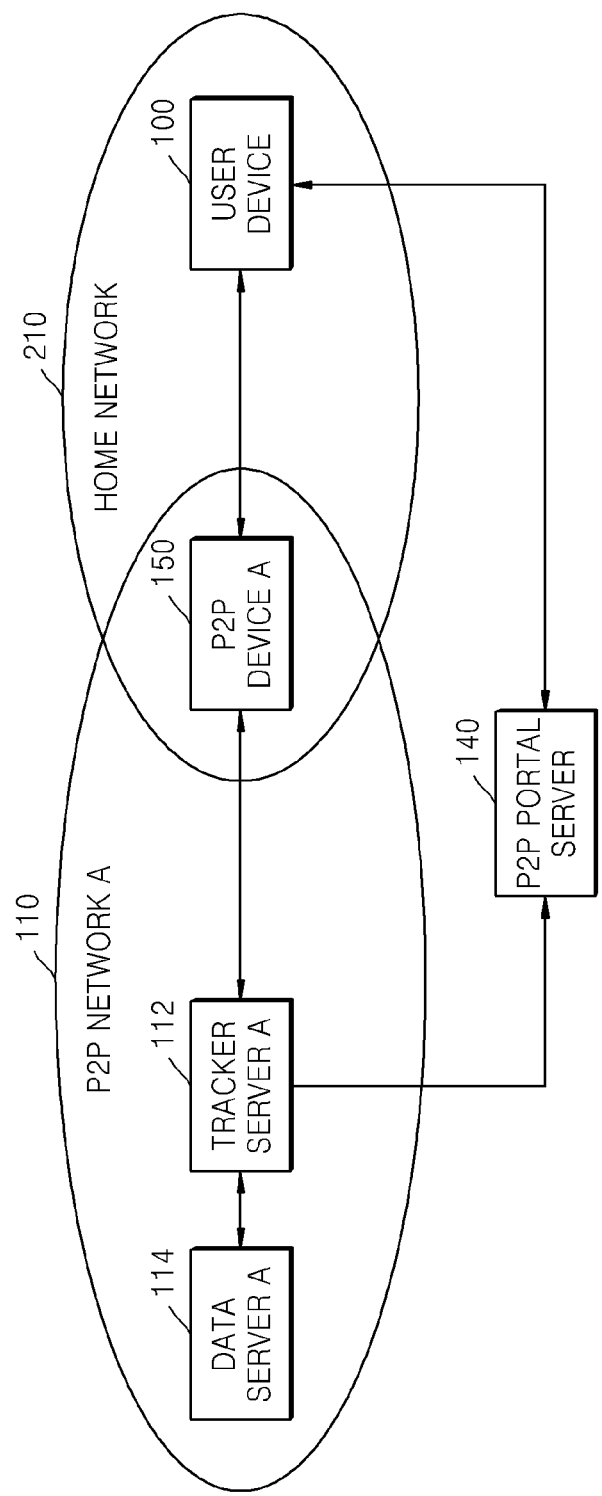
FIG. 2 is a diagram of a data reception system that operates via a P2P network according to another exemplary embodiment of the present invention.

FIG. 2 is a diagram of a data reception system that operates via a P2P network according to another exemplary embodiment of the present invention.

FIG. 2 is related to a method performed, for example, by the user device 100 of the exemplary embodiment shown in FIG. 1. In this method, the user device 100 receives data shared in a P2P network A 110 by using a P2P device A 150 that exists in a home network 210.

Referring to FIG. 2, in order to receive the data shared in the P2P network A 110, the user device 100 uses the P2P device A 150 having a P2P client function of the P2P network A 110. The data shared in the P2P network A 110 may be data provided from a data server A 114 to peers of the P2P network A 110.

Since the user device 100 does not have the P2P client function, that is, an application for accessing the P2P network A 110, the user device 100 is not capable of directly receiving the data of the P2P network A 110. Accordingly, the user device 100 receives the data exchanged in the P2P network A 110 by using the P2P device A 150 of the home network 210. The user device 100 requests the P2P device A 150 for the data that can be received via the P2P network A 110, and as a response to the request, receives data relayed by the P2P device A 150.

Information about the data that can be received via the P2P network A 110 and information about a P2P device to be used to receive the data are received from a P2P portal server 140. As described above in relation to FIG. 1, the P2P portal server 140 provides information to the user device 100, where the information is received from the tracker servers 112, 122, and 132 and is about data shared between one or more P2P networks and about peers respectively connected to the one or more P2P networks.

Figure 3:
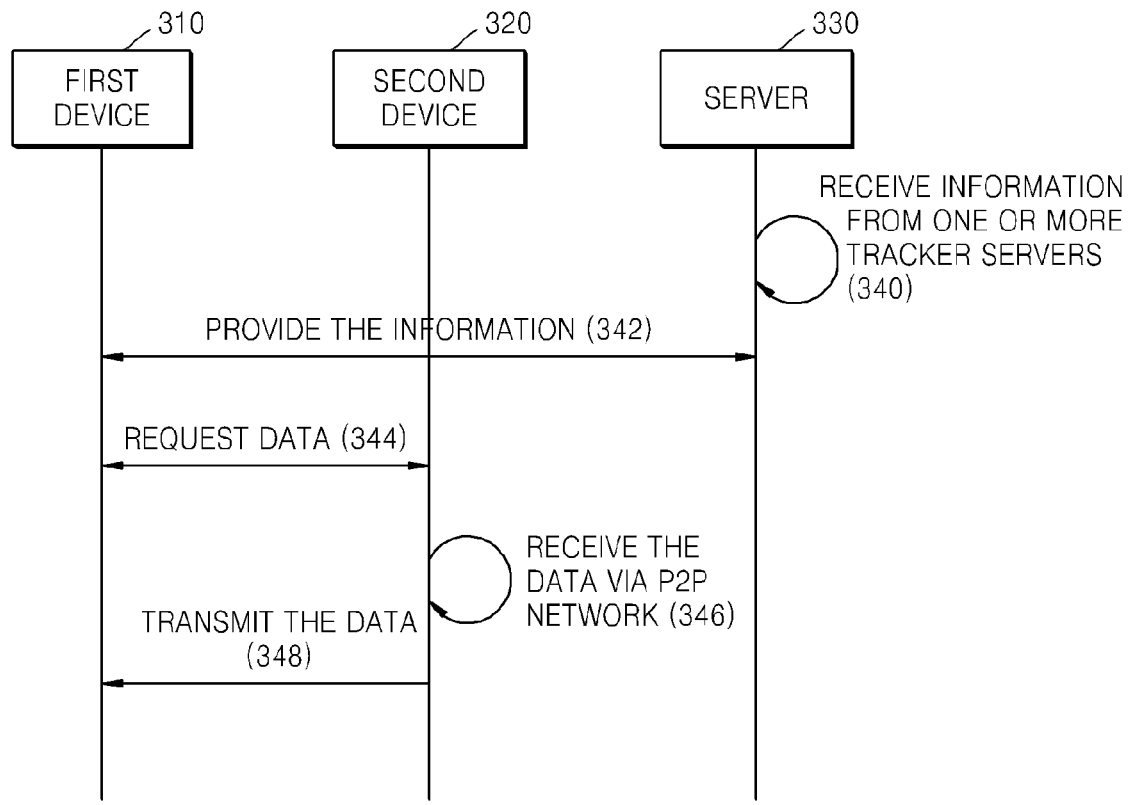
FIG. 3 is a flowchart of a method of receiving data, according to an exemplary embodiment of the present invention.

FIG. 3 is a flowchart of a method of receiving data, according to an exemplary embodiment of the present invention.

In FIG. 3, by way of an example, a first device 310 may correspond to the user device 100 of FIG. 2, a second device 320 may correspond to the P2P device A 150 of FIG. 2, and a server 330 may correspond to the P2P portal server 140 of FIG. 2.

In operation 340, the server 330 receives information from one or more tracker servers, where the information is about data that can be received via one or more P2P networks and about peers respectively connected to each of the one or more P2P networks.

In other words, the server 330 receives the information from the one or more tracker servers that respectively manage one or more P2P networks, where the information is about the data that can be received via one or more P2P networks. That is, the information is about the data exchanged in each P2P network. Also, the server 330 receives the information about the peers respectively connected to each of the one or more P2P networks, that is, the information about the P2P devices.

In operation 342, the server 330 transmits the information received from the one or more tracker servers in operation 340 to the first device 310. The information about the data that can be received via one or more P2P networks and the information about the peers respectively connected to each P2P network are transmitted to the first device 310 connected to the server 330.

In operations 344, 346, and 348, the first device 310 receives data via the second device 320 that is a peer connected to a P2P network that provides predetermined data.

In operation 344, the first device 310 requests the predetermined data. The first device 310 selects target data based on the information about the data that can be received via one or more P2P networks, where the information is received in operation 342. After that, based on the information about the peers respectively connected to each P2P network, received in operation 342, the first device 310 requests the second device 320 to transmit the selected target data. The second device 320 is a peer connected to the P2P network capable of receiving the selected target data.

For example, a list about the data that can be received via one or more P2P networks may be displayed to a user, where the information about the data is received in operation 342, and when the user selects predetermined data from the displayed list, the first device 310 may request the second device 320 to transmit the selected data according to an IP address linked in the displayed list. As described above, the data may be data related to a P2P streaming service, and in this case, the list about the data corresponds to a list about streaming service channels.

The request in operation 344 may be performed according to a Hypertext Transfer Protocol (HTTP). For example, the first device 310 may generate a HTTP GET message for requesting predetermined data and may transmit the HTTP GET message to the second device 320.

In operation 346, the second device 320 receives the data via the P2P network, wherein the data is requested by the first device 310 in operation 344. That is, the data requested by the first device 310 is received via the P2P network to which the second device 320 is connected.

The second device 320 accesses the P2P network by using a P2P client function, and receives the data requested by the first device 310. As illustrated in FIG. 3, when the second device 320 functions to only relay the data to the first device 310, the second device 320 may function in a background mode in which only the P2P client function is used and other functions are suspended.

In operation 348, the second device 320 transmits the data received in operation 346 via the P2P network to the first device 310. The data received in operation 346 may be transmitted to the first device 310 directly or may be buffered in a predetermined data unit and then transmitted to the first device 310. The data transmission in operation 348 may be performed according to a HTTP, similar to the data request in operation 344.

Figure 4:
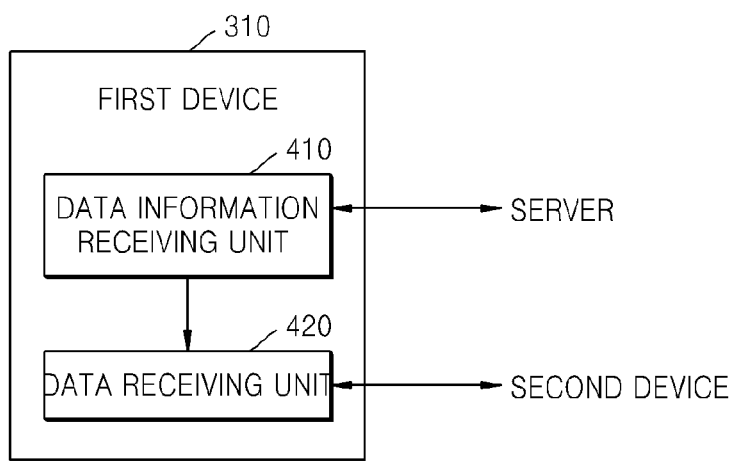
FIG. 4 is a diagram of a data receiving apparatus according to an exemplary embodiment of the present invention.

FIG. 4 is a diagram of a data receiving apparatus according to an exemplary embodiment of the present invention.

In FIG. 4, the exemplary first device 310 of FIG. 3 is illustrated in detail. Referring to FIG. 4, the first device 310 according to an exemplary embodiment includes a data information receiving unit 410 and a data receiving unit 420.

The data information receiving unit 410 receives information from the server 330 (refer to FIG. 3), where the information is about data that can be received via one or more P2P networks and about peers respectively connected to each P2P network. The information collected from one or more tracker servers for respectively managing one or more P2P networks is received from the server 330. As described above, the data is not limited in terms of types and may be AV media data. Also, the data may be streaming data for streaming AV media content via the P2P network.

The data receiving unit 420 requests a second device 320 for predetermined data based on the information received by the data information receiving unit 410, and receives the data as a response to the request. The first device 310 and the second device 320 may be included in the same home network.

The predetermined data is selected based on the information about the data that can be received via one or more P2P networks. After that, according to the information about the peers respectively connected to each P2P network, the second device 320, which is a peer connected to the P2P network capable of receiving the selected data, is requested for the selected data. The second device 320 has a P2P client function of the P2P network and is capable of receiving the selected data. The request for the selected data may be performed using a HTTP method, e.g., a HTTP GET method.

Figure 5:
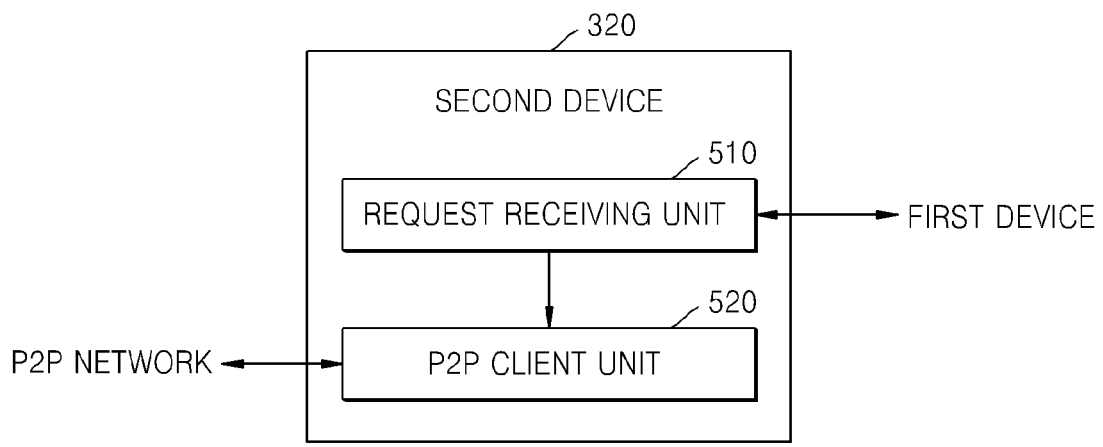
FIG. 5 is a diagram of a data relaying apparatus according to an exemplary embodiment of the present invention.

FIG. 5 is a diagram of a data relaying apparatus according to an exemplary embodiment of the present invention.

In FIG. 5, the exemplary second device 320 of FIG. 3 is illustrated in detail. Referring to FIG. 5, the second device 320 according to an exemplary embodiment includes a request receiving unit 510 and a P2P client unit 520.

The request receiving unit 510 receives a data request from a first device 310. That is, the request receiving unit 510 receives the data request from the first device 310, where the data request is about predetermined data that is received from a server 330 and transmitted by the second device 320.

A HTTP GET message, which is generated according to a HTTP method for requesting transmission of the predetermined data, is received from the first device 310.

The P2P client unit 520 receives the predetermined data via the P2P network and transmits the predetermined data to the first device 310, according to the data request received by the request receiving unit 510.

To be more specific, an application capable of accessing the P2P network is operated to receive the predetermined data, which is requested by the first device 310, via the P2P network to which the second device 320 is connected, and then the received predetermined data is transmitted to the first device 310. As described above, when no other functions, except for a P2P client function, are operated, the second device 320 may function in a background mode.

Figure 6:
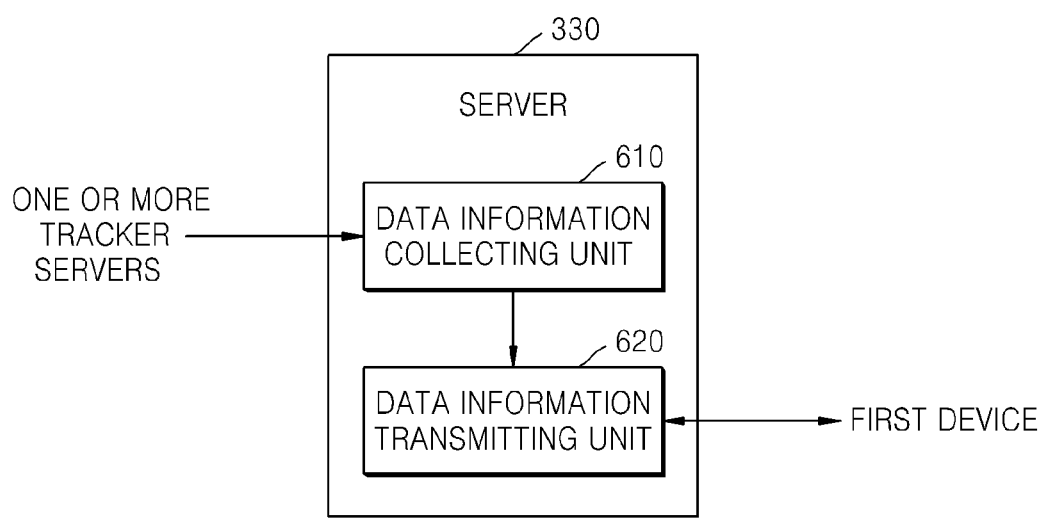
FIG. 6 is a diagram of an information managing apparatus according to an exemplary embodiment of the present invention.

FIG. 6 is a diagram of an information managing apparatus according to an exemplary embodiment of the present invention.

In FIG. 6, the exemplary server 330 of FIG. 3 is illustrated in detail. Referring to FIG. 6, the server 330 according to an exemplary embodiment includes a data information collecting unit 610 and a data information transmitting unit 620.

The information collecting unit 610 receives information from one or more tracker servers that respectively manage one or more P2P networks, where the information is about data that can be received via one or more P2P networks. That is, the information is about data exchanged in each P2P network. Also, the data information collecting unit 610 receives information about peers respectively connected to each P2P network, that is, the information about P2P devices.

The information about the data shared between one or more P2P networks and the information about the peers respectively connected to each P2P network may be collected by the data information collecting unit 610 and may be managed by the server 330.

The data information transmitting unit 620 transmits the information about the data that can be received via one or more P2P networks and the information about the peers respectively connected to each P2P network to a first device 310, where the two pieces of information are collected by the data information collecting unit 610. The information about the peers respectively connected to each P2P network, which is transmitted from the data information transmitting unit 620 to the first device 310, includes information about a second device 320. At least one of information about a GUID of the second device 320 and information about an IP address of the second device 320 is included in the information about the second device 320.

According to one or more exemplary embodiments of the present invention, a device not having a P2P client function for accessing different P2P networks may access data shared in the P2P network by using another device so that data communication via the P2P network may be freely performed. Also, a P2P device is not required to have a plurality of P2P client functions so that it is not necessary to design high specification P2P device hardware.

The data receiving apparatus, the information managing apparatus, and the data relaying apparatus according to one or more exemplary embodiments of the present invention can include a bus coupled to units of each apparatus described in FIGS. 4, 5, and 6, and at least one processor combined with the bus. Also, the data receiving apparatus, the information managing apparatus, and the data relaying apparatus according to one or more exemplary embodiments of the present invention can include a memory which is coupled to the bus so as to store commands, received messages, or generated messages and which is combined with the at least one processor for performing the commands.

The system according to the one or more exemplary embodiments of the present invention can also be embodied as computer-readable codes on a computer-readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of receiving predetermined data, performed by a first device, the method comprising:
    receiving, by the first device provided without a peer-to-peer (P2P) client function, from a server information about data that can be received via at least one P2P network and information about at least one peer respectively connected to each of the at least one P2P network;
    selecting the predetermined data based on the information received from the server about the data that can be received via the at least one P2P network;
    selecting, by the first device, a second device to receive the predetermined data based on the information about the at least one peer; and
    receiving the predetermined data without the P2P client function via the second device from the at least one peer connected to a first P2P network of the at least one P2P network which can receive the predetermined data, wherein the information about the data and the information about the at least one peer is directly received from the server by a data information receiving unit of the first device, and wherein the predetermined data is indirectly received via the second device from the at least one peer by a data receiving unit of the first device.

2. The method of claim 1, wherein the first device and the second device are devices in same home network.

3. The method of claim 2, wherein the receiving the predetermined data comprises:

requesting the predetermined data from the second device connected to the first P2P network, based on the information about data and based on the information about the at least one peer; and receiving the predetermined data as a response to the requesting, wherein the second device receives the predetermined data via the P2P network which can receive the predetermined data, and transmits the predetermined data to the first device.

4. The method of claim 2, wherein the information about the at least one peer comprises at least one of information about globally unique identifiers of the at least one peer and information about internet protocol addresses of the at least one peer.

5. A data receiving apparatus corresponding to a first device for receiving predetermined data without a peer-to-peer (P2P) client function, the data receiving apparatus comprising:

a data information receiving unit which directly receives from a server information about data that can be received via at least one P2P network and information about at least one peer respectively connected to each of the at least one P2P network, selects the predetermined data based on the information received from the server about the data that can be received via at least one P2P network; and a data receiving unit which selects a second device to receive the predetermined data based on the information about the at least one peer; and indirectly receives the predetermined data without the P2P client function via the second device connected to a first P2P network of the at least one P2P network which can receive the predetermined data, wherein at least one of the data information receiving unit and the data receiving unit is implemented as a hardware component.

6. The data receiving apparatus of claim 5, wherein the first device and the second device are devices in same home network.

7. The data receiving apparatus of claim 6, wherein the data receiving unit requests the predetermined data from the second device connected to the first P2P network, based on the information about data and the information about at least one peer, received from the server, and receives the predetermined data, and wherein the second device receives the predetermined data via the first P2P network, and transmits the predetermined data to the first device.

8. The data receiving apparatus of claim 6, wherein the information about the at least one peer comprises at least one of information about globally unique identifiers of the at least one peer and information about internet protocol addresses of the at least one peer.

9. A non-transitory computer readable recording medium having recorded thereon a program for executing the method of claim 1.

* * * * *